Figure 1:
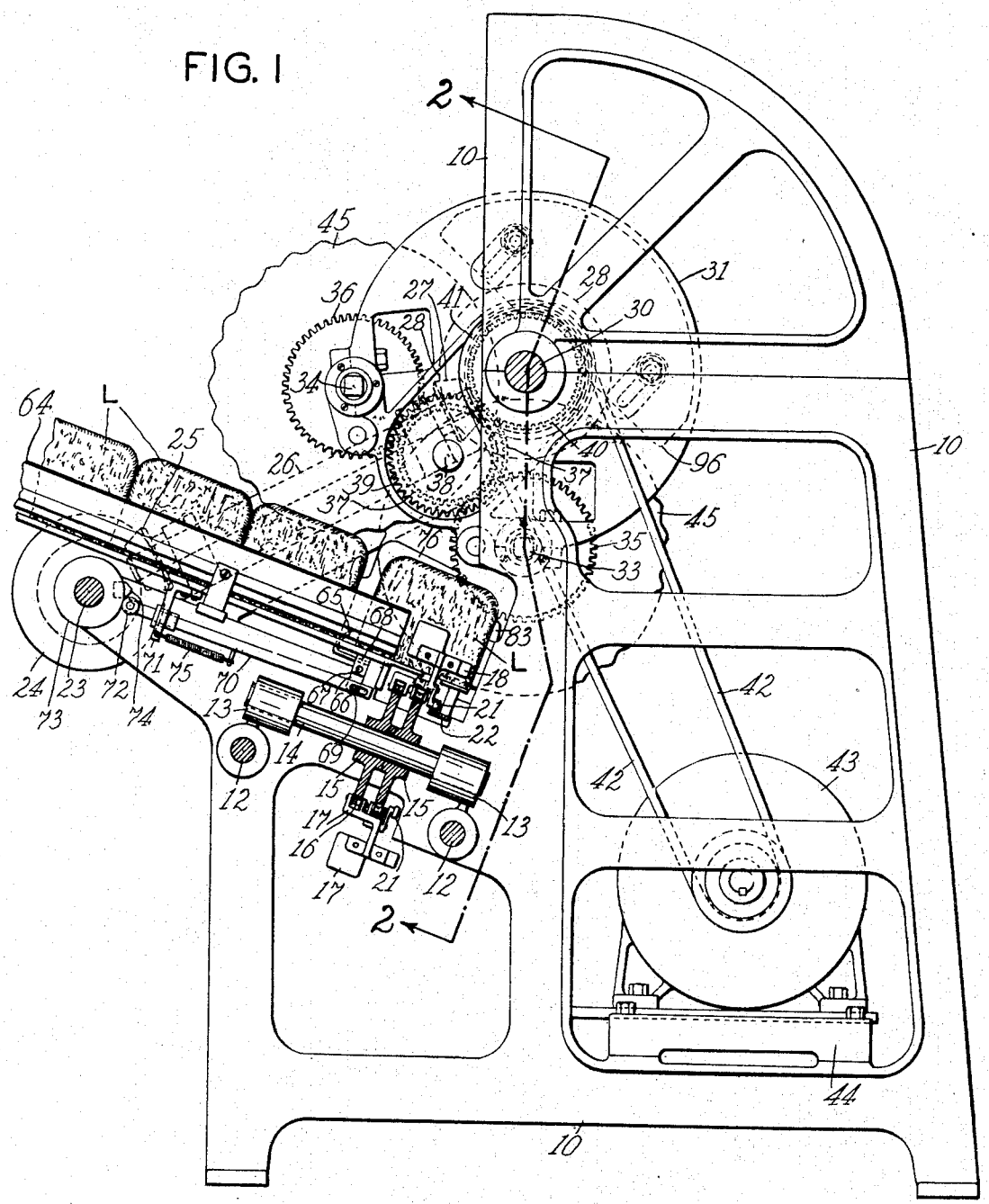

July 16, 1935.  F. R. SCHMITT  2,008,111
EPICYCLIC BREAD SLICING MACHINE
Filed Aug. 20, 1931  4 Sheets-Sheet 1

INVENTOR
Frank Reinhold Schmitt
BY
Sydney Prescott
ATTORNEY

July 16, 1935.  F. R. SCHMITT  2,008,111
EPICYCLIC BREAD SLICING MACHINE
Filed Aug. 20, 1931  4 Sheets-Sheet 4

INVENTOR
Frank Reinhold Schmitt
BY
Sydney J Prescott
ATTORNEY

Patented July 16, 1935

2,008,111

UNITED STATES PATENT OFFICE 2,008,111

EPICYCLIC BREAD SLICING MACHINE

Frank Reinhold Schmitt, Queens Village, N. Y., assignor to American Machine & Foundry Company, a corporation of New Jersey Application August 20, 1931, Serial No. 558,214

14 Claims. (Cl. 146—98)

This invention relates to bread slicing machines and particularly to an improved type of machine designed through the elimination of reciprocating parts to operate at higher speeds and with less vibration than heretofore possible. To this end, it is an object of the invention to provide a slicing machine in which the movements of the slicer blades are continuous smooth rotary motions. Another object of the invention is to provide for better supporting and securing of the loaves and the slices resulting therefrom at the time of slicing. Another important object is to provide for the slicing of hot bread without concave slices particularly at the end, and without caving in the forward side of the loaf. Since most bread is sliced hot while very soft, and since it then presents very little resistance to crushing and deforming this is an important item, and applicant has in order to avoid these difficulties, arranged his knives in tandem so that only one half of the slicing is done at one time and accordingly twice the support is provided at each slicing position. This feature has been found particularly efficacious in eliminating the concave slice which in practice have been quite common with slicers of this general type. Better slices have been obtained also by reason of the supporting and securing of the slices against rotation and displacement as the result of the friction of the knives against their surfaces, applicant providing for this purpose clamping mechanism and also impaling pins which cooperate with the clamps so they may be used separately to secure each individual slice. It will be seen that in this manner the slices are secured quite firmly despite the fact that the surfaces of the loaf must be left open to the action of the knives.

Another object of the invention is to provide smoother slices due to the knife-like rather than the saw-like action of rotating disks as well as to secure these results without certain disadvantages which in some circumstances result from the larger surface of the knives and from friction on the knife. Thus, due to the tandem and staggered relationship of the plurality of gangs of knives used, fewer cuts are being made at one time and there is less compression at any one time on the bread due to the action and thickness of the knives. A principal object is the elimination of the vibration which results from reciprocating parts. This vibration from such parts is very difficult to eliminate necessitating expensive and imperfect dynamic and static balancing. Other objects are to provide a simple and convenient construction from which knives may be readily removed and replaced and to provide a simple and effective drive for rotating the knives about their own axis and also giving them orbital movement in a circular path crossing the path of the loaves. Still another object is to provide a safety lock which will positively prevent any accidental movement of the plate carrying knives while the power is turned off and knives are being worked on and which will prevent operation of the clutch by which the knife supporting head is driven before unlatching the safety lock. Another object is to provide in combination with such a machine a suitable bread separator for separating the loaves to be sliced from loaves in face to face contact in a supply chute. With these and other objects not specifically mentioned in view the invention consists in certain constructions and combinations which will be hereinafter fully described and then specifically set forth in the claims hereunto appended.

Figure 2:
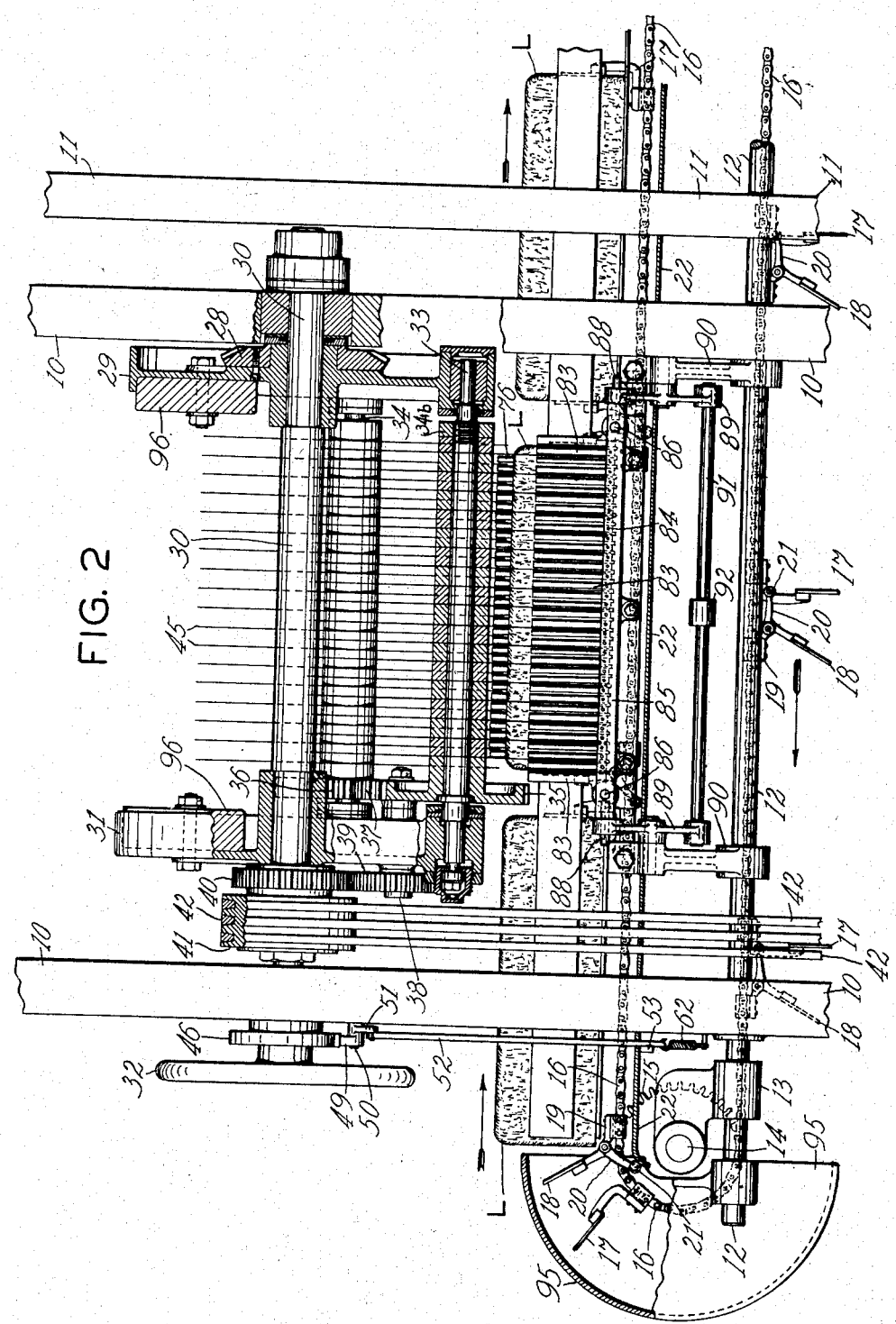
Figure 3:
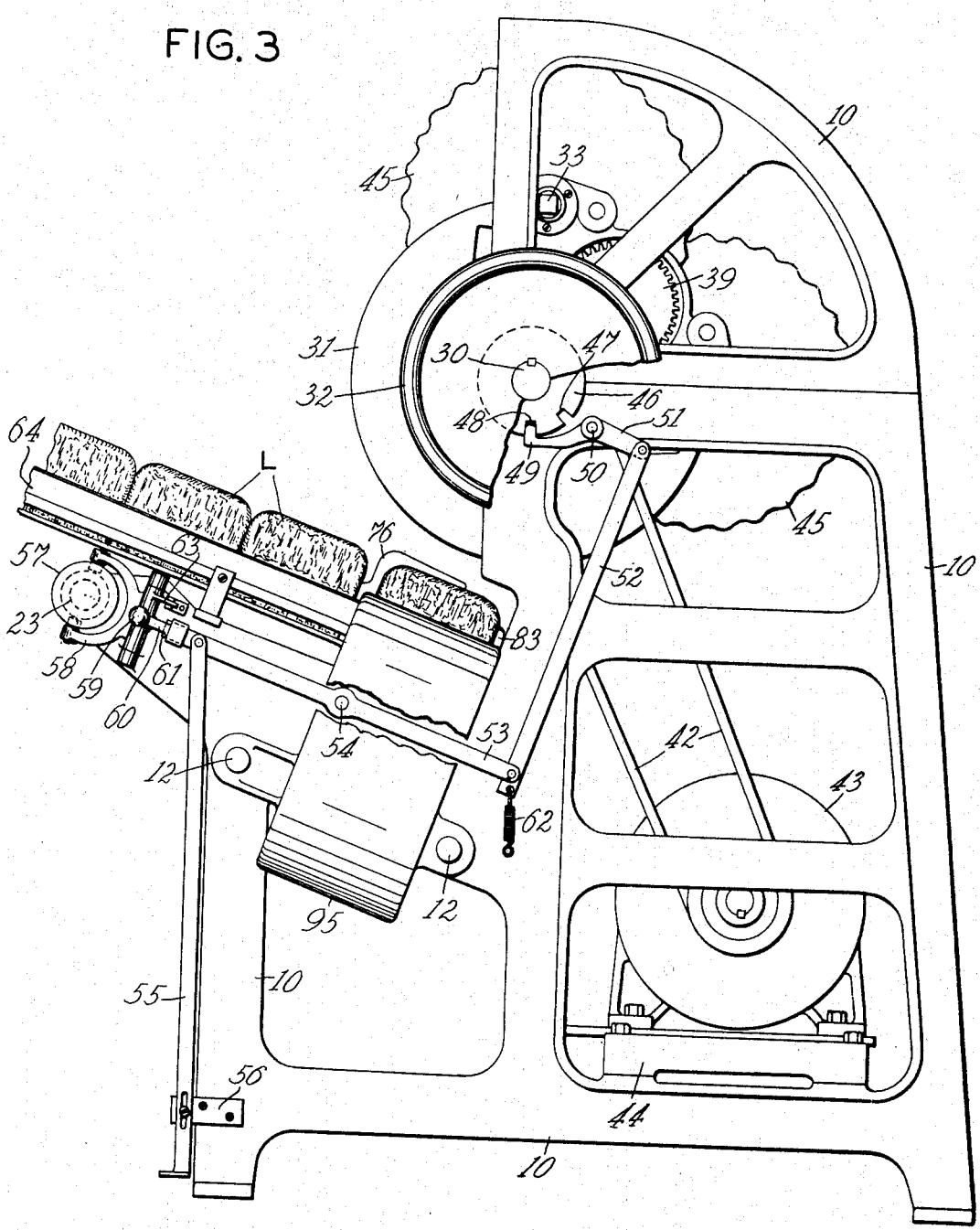
Figure 4:
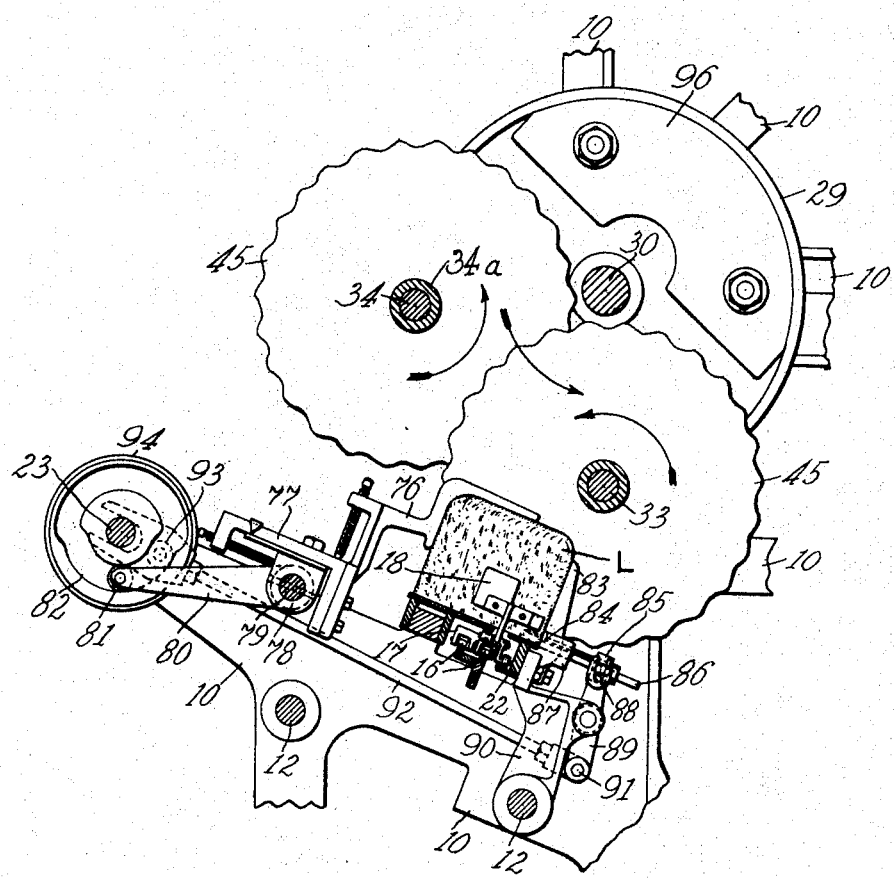

In the accompanying drawings, which form a part of this specification and in which like characters of reference indicate the same or like parts, Fig. 1 is a side elevation partly in section of the improved slicing machine; Fig 2 is a sectional end elevation taken on line 2—2 of Fig. 1; Fig. 3 is a side elevation of the slicing machine shown in Fig. 1, showing the safety lock of the revolving knife supporting head; Fig. 4 is a detail sectional side elevation showing the mechanism for clamping the loaf.

In carrying the invention into effect there is provided in combination with a runway for bread loaves, devices for feeding loaves along said runway together with a gang of knives for slicing the loaves in the runway and means for moving the said knives in an orbital path to carry the knives across the path of the loaves. Preferably means are provided for rotating said gang of knives about its own axis. In the best constructions a second gang of knives is provided behind the first gang, the knives of the second gang preferably being staggered relative to the first gang and in the most desirable constructions being rotated about its own axis. In the best form of the invention an intermittently operated clamp engages the loaf during the slicing operation. The various means referred to may be varied widely in construction within the scope of the claims, for the particular device selected to illustrate the invention is but one of many possible concrete embodiments of the same. The invention therefore is not to be restricted to the precise details shown and described.

Referring now to the drawings, particularly

Figs. 1 and 2, the entire slicing attachment is mounted in the slicer frames 10 kept in alignment with a bread wrapping machine with which this machine is commonly used by two guide shafts 12 connected to the frame 11 of the wrapping machine, which shafts on their overhanging ends carry bearing brackets 13 supporting a shaft 14 on which are mounted sprockets 15 carrying the endless conveyer chains 16 conveniently driven from the main drive of the wrapping machine. The conveyer chains 16, at equal intervals, are equipped with pairs of opposed gripping lugs 17, 18, the hind lug of each pair and the fore lug of the next pair holding a loaf L between them. Lugs 17 are mounted rigidly on the chains 16 while lugs 18 are of the swinging type, being pivoted to bearing links 19 mounted on the chains 16 and equipped with arms 20 carrying rollers 21 bearing against a guide plate 22. The reason for making one of each pair of clamp lugs swingable is to assure a perfect entry of the loaf between the open lugs 17 and 18, the latter of which by the advancement of the chains 16, through roller 21 and guide plate 22, is then swung toward the loaf L, assuring a firm grip on the latter and eliminating shifting of the same during the slicing operation as well as during its transfer to the wrapping mechanism. The chain 16 is driven in intermittent motion from the main drive of the wrapping machine and is a part thereof. It is for convenience extended into the slicing mechanism for the purpose of eliminating an extra conveyer or separate handling of the loaves and the application of trays, etc., for holding the slices together in transit.

The motion of the slicing machine, except the rotation of its knives, is derived from a shaft 23 operated for convenience when used in connection with a wrapping machine, through a drive from the main drive of the wrapping machine. Shaft 23 is supported in bearings of frames 10 and and carries a bevel gear 24 driving bevel gear 25 on shaft 26 having another bevel gear 27 meshing with bevel gear 28 mounted on knife supporting head 29 keyed to shaft 30 carrying a duplicate knife supporting head 31. Shaft 30 is supported in bearings of frames 10 and is equipped with a hand wheel 32.

The knife supporting heads 29 and 31 in easily demountable bearings carry the knives in gangs on shafts 33 and 34 which are driven from gears 35 and 36 respectively.

The knife gangs are arranged in tandem, see Fig. 4, with the knives in one gang in staggered relation to the knives in the other. This assures a thicker body of bread between adjoining knives when entering the loaf and thus reduces the likelihood of crushing or deforming the loaf and slices. Another valuable result is that the maximum power required is greatly reduced and the power load is more evenly distributed. The importance of this will be realized from the fact that the power required for operating the slicers is from three to five times as great as that required for instance to run an entire bread wrapping machine. Part of this reduction in power consumption is due to the fact that half the knives operating at once compress the bread laterally, due to their thickness, less than all the knives operating at once.

The knives are secured on the shaft by means of a series of clamping collars 34a and are clamped against the knife disk by means of a clamp nut 34b. Thus when it is desired to remove a worn or broken knife it is only necessary to demount the shafts 33 or 34, unscrew nut 34b and slide off collars and knives. By using narrower or broader collars the thickness of the slice may be varied.

Both gears 35 and 36 are in mesh with a gear 37 mounted on shaft 38 which is supported by knife suporting head 31. Shaft 38 carries also a gear 39 meshing with a gear 40 loosely mounted on shaft 30. Fastened to gear 40 is a pulley 41 driven through V-shaped belts 42 from an independent motor 43 mounted on base 44 of frames 10. Knife shafts 33 and 34 carry a plurality of circular knives 45 suitably spaced apart to produce slices of the required thickness. The gangs of knives 45 are independently and continuously rotated about their own axis through the described gear arrangement by a motor 43. This arrangement has the advantage of making practicable uniform speed of the knives 45 regardless of whether the wrapping machine and slicing attachment are operated slow or fast. All motions in the slicing attachment are continuous and rotary thus eliminating vibration, the knives 45 traveling in an orbital path around the shaft 30.

Referring to Fig. 3, shaft 30 is equipped with a disk 46 having slots 47 and 48 provided for engagement with a lock lever 49 pivoted on a stud 50 and having an arm 51 mounted through rod 52 to one arm of a double lever 53 pivoted on stud 54. Lever 53 is actuated by a foot lever 55 slidably mounted in a bracket 56 on frame 10. This locking mechanism also acts as a safety device working in conjunction with clutch 57 on shaft 23 which drives the slicing mechanism. Clutch 57 is operated by a fork lever 58 equipped with a handle 59. The fork lever 58 has an arm 60 swinging in the path of an extension 61 of lever 53 when the locking mechanism is in engagement, so that the machine cannot be started or clutch 57 operated as long as extension 61 is in the way of the clutch operating lever. Only by tripping foot lever 55, the locking mechanism in disk 46 can be disengaged, thus lowering the extension 61 and giving lever 60 free movement to engage the clutch and start the machine. By this means the knives may be locked in fixed position and the clutch can not be engaged while the knives are locked. Rod 52 is equipped with a tension spring 62 so that lock lever 49 is always in tension towards slots 47 and 48, but while clutch 57 is in engagement, a snap lock 63 holds arm 60 of clutch lever 58 in such a position that extension 61 of lever 53 cannot move backward. Slots 47 and 48 are so arranged that if the machine is locked in either one of them, the knives are entirely out of the way and the wrapping machine can be used without the slicer to wrap unsliced bread, and furthermore, the knife supporting heads 29 and 31 are in such a position that it is easy to remove knife shafts 33 and 34 and knives 45 for adjustment or replacement.

The loaves L are fed into the machine on an inclined feed chute 64 mounted on frames 10, Fig. 1. The feed chute 64 is provided with means for separating the loaves for proper timing on their way onto the conveyer chains 16. This separating of the loaves is accomplished by a stop finger 65 mounted on a lever 66 pivoted on a stud 67 supported by a bracket 68 on the bottom plate of chute 64. The lower part of lever 66 carries a pin 69 engaging in a slot of operating rod 70 slidably supported by bracket 71. Rod 70 is equipped with a roller 72 bearing against a disk 73 mounted on the continuously rotating shaft 23. Disk 73 has a nose 74 which upon each revolution pushes roller 72 and rod 70 forward, thus causing stop 65 to swing out of the way of the loaf and allowing it to enter between clamp lugs 17 and 18 of the chain conveyer 16. This device is timed in synchronism with the intermittently driven chain conveyer 16. Rod 70 is equipped with a tension spring 75 which holds the roller 72 in tension against disk 73. The weight of the passing loaf, when released by the stop as explained, holds the stop 65 down, but the latter will come up into the space between two loaves due to the tension of the spring 75 on the rod 70, thereby swinging the stop upwardly into engagement with the bottom front edge of the next loaf and retaining it in engagement with said edge until the stop is again released by the action of the nose 74 and will thus separate them.

As heretofore stated, the loaf during the slicing operation is clamped in a cutting box consisting of a series of spaced clamp fingers 76 acting on one side and the top of the loaves. These fingers 76 as shown in Fig. 4, are attached to a bracket 77 which is adjustably fastened to a lug 78 mounted on shaft 79 oscillated through a lever 80 and roller 81 by a cam 82 mounted on shaft 23. The latter operates the fingers 76 in such a manner as to clamp the loaf during the slicing operation, and then to release the loaf, allowing the sliced loaf to move out and a new loaf to move into the cutting box and then repeat the operation. The fingers 76 clamp the loaf against the stationary slotted supporting fingers 83, thus assuring even and straight cut slices as the loaf is held firm and tight from every side. In order to prevent uneven or curved cutting of the rear end of the loaf due among other things to the tendency of the slices to rotate, a number of steadying impaling pins 84 cooperate with the clamp fingers to enter the loaf during the slicing operation. The pins 84 are mounted on a bar 85 slidably supported by guide rods 86 stationarily mounted in brackets 87. Bar 85 is equipped with studs 88 engaging with double levers 89 pivoted to brackets 90 mounted on rear guide shaft 12, Figs. 2 and 4. Levers 89 are connected by rod 91 carrying in its center a connecting rod 92 actuated through roller 93 by a cam 94 mounted on shaft 23 behind the cam 82, as viewed in Fig. 4. Pins 87 enter the loaf only during the cutting operation, withdrawing again immediately after the same.

The improved slicing device is equipped with a safety guard 95, Fig. 2 and the knife supporting heads 29 and 31 carry the adjustable counterweights 96, Fig. 4.

What is claimed is:

1. The combination with a runway for bread loaves, of devices for clamping loaves by their ends and feeding them endwise along said runway, a gang of knives for slicing the loaves, means for bodily moving said knives in a closed orbital path to carry the knives across the path of the loaves, and means for rotating said gang of knives about its own axis to slice the loaves, whereby said devices will press and hold together the slices of each loaf while feeding it after it is sliced.

2. The combination with a runway for bread loaves, of devices for clamping loaves by their ends and feeding them endwise along said runway, a gang of knives for slicing the loaves, means for bodily moving said knives in a closed orbital path to carry the knives across the path of the loaves, and a second gang of knives behind the first and operated by said means, the knives of each gang being spaced the thickness of two slices and the knives of one gang being staggered the thickness of one slice with respect to the knives of the other gang, whereby said gangs will slice each loaf, and said devices will press and hold together the slices of each loaf while feeding it after it is sliced.

3. The combination with a runway for bread loaves, of devices for clamping loaves by their ends and feeding them endwise along said runway, a gang of knives for slicing the loaves, means for bodily moving said knives in a closed orbital path to carry the blades across the path of the loaves, and a second gang of knives behind the first and operated by said means, the blades of said second gang being staggered relative to the first gang, whereby said gangs will slice each loaf, and said devices will press and hold together the slices of each loaf while feeding it after it is sliced.

4. The combination with a runway for bread loaves, of devices for feeding the loaves along said runway, a gang of knives for slicing the loaves, and means for bodily moving said knives in a closed orbital path to carry the knives across the path of the loaves, the gang of knives being rotatable about its own axis, a drive for moving the knives in said orbital path in predetermined timed relation to the operation of the loaf feeding devices, and a separate drive for rotating the knives of the gang at a speed independent of the speed of the rest of the machine.

5. The combination with a loaf support, of devices on said support for clamping the ends of a loaf, means for moving said support to move the clamped loaf endwise into the range of action of said slicing means, plural knife slicing means, mechanism for periodically moving said slicing means transversely of said support to slice a stationary loaf thereon into a plurality of slices, whereby said devices press and hold together the slices of the loaf after it is sliced, and means moving toward and away from the loaf and connected in timed relation to said mechanism for clamping the sides of the loaf during slicing.

6. Bread loaf securing means for slicing machines comprising devices having opposed surfaces for engaging the loaf, mechanism intermittently operating one of said devices to clamp the loaf, and movable pins cooperating with said devices to pierce and pin in position the clamped loaf, and mechanism intermittently operating said pins.

7. Bread loaf securing means for slicing machines comprising devices having opposed surfaces for engaging the loaf, mechanism operating one of said devices to clamp the loaf, and movable pins cooperating with said devices to pierce and pin in position the clamped loaf, said devices including a plurality of spaced clamps with the distance between the centers of the clamps equal to the thickness of a slice, and said pins being aligned with said clamps to provide at least one clamp and at least one pin for each slice.

8. In a rotary slicing machine having spaced revolving arms, a bearing in each of said arms eccentric to the axis of rotation of said arms, a shaft journaled in said bearings, driving means for rotating said shaft, means for revolving said arms, a plurality of apertured knife disks strung on said shaft, spacing collars loosely mounted on the shaft with a collar between each disk and means for detachably clamping the disks and collars on said shaft.

9. The combination with a runway for bread loaves, of devices for feeding the loaves along said runway, a gang of knives for slicing the loaves, means for bodily moving said knives in a closed orbital path to carry the knives across the path of the loaves said means including a pair of coaxial rotating arms and mechanism for rotating said knives about their own axis comprising a shaft journaled in said arms, a driving member coaxial with the axis of the arms and connections between said member and said shaft.

10. The combination with a runway for bread loaves, of devices for feeding the loaves along said runway, a gang of knives for slicing the loaves, means for bodily moving said knives in a closed orbital path to carry the blades across the path of the loaves and manually operable machinism for incapacitating said means while it is moving the gang of knives in the orbital path and then locking said gang in inoperative position, said means including a pair of coaxial rotating arms and mechanism for rotating said knives about their own axis comprising a shaft journaled in said arms, a driving member coaxial with the axis of the arms, and connections between said member and said shaft.

11. In a bread slicing machine, the combination with a gang of slicing knives, of mechanism for giving the gang bodily movement in a closed orbital path, means for incapacitating said mechanism while it is moving the gang of knives in the orbital path and then locking said gang in inoperative position, said mechanism including a driving clutch and connections between said means and said clutch for preventing engagement of the clutch while the blades are locked.

12. The combination with bread forwarding mechanism, of gang knives, of means for producing an epicyclic rotating movement of said gang knives on their own axes and about an external axis to cause them to move into the path of bread forwarded by said mechanism to cut a loaf into slices in one cycle of machine operations, said gang knives being arranged in two sets in laterally staggered relationship with each other and one set being circumferentially behind the other.

13. The combination with bread forwarding mechanism, of gang knives, and means for producing an epicyclic rotating movement of said gang knives on their own axes and about an external axis to cause them to move into the path of bread forwarded by said mechanism to cut a loaf into slices in one cycle of machine operations, and manually operable devices for incapacitating said means and locking said knives in inoperative position.

14. The combination with a runway for bread loaves, of means for slicing bread in said runway including a rotary slicing blade rotating on an axis extending along said runway, a chain conveyor having an endless series of opposed pairs of grippers arranged to grip opposite ends of the loaves outside the range of action of said blade, and means operating said chain conveyor to move the loaves endwise along said runway into and beyond the range of action of said blades while the grippers maintain their grip on the loaves, said conveyor including a pair of separate sprockets, parallel chains passing over said sprockets, the opposed grippers of each pair being secured to different chains to permit relative adjustment of the grippers of each of said pairs by adjusting one chain lengthwise with respect to the other.

FRANK REINHOLD SCHMITT.